(12) United States Patent
Lee

(10) Patent No.: US 11,091,063 B2
(45) Date of Patent: Aug. 17, 2021

(54) ECCENTRICITY PREVENTION APPARATUS FOR PUMPING DEVICE

(71) Applicant: HYUNDAI TRANSYS INCORPORATED, Seosan-si (KR)

(72) Inventor: Young Sun Lee, Seoul (KR)

(73) Assignee: HYUNDAI TRANSYS INCORPORATED, Seosan-si (KR)

( * ) Notice: Subject to any disclaimer, the term of this patent is extended or adjusted under 35 U.S.C. 154(b) by 0 days.

(21) Appl. No.: 16/880,227

(22) Filed: May 21, 2020

(65) Prior Publication Data
US 2020/0384898 A1 Dec. 10, 2020

(30) Foreign Application Priority Data

Jun. 5, 2019 (KR) .................. 10-2019-0066775

(51) Int. Cl.
*B60N 2/16* (2006.01)
*B60N 2/90* (2018.01)

(52) U.S. Cl.
CPC .............. *B60N 2/165* (2013.01); *B60N 2/90* (2018.02); *B60N 2/168* (2013.01)

(58) Field of Classification Search
CPC .................................. B60N 2/165; B60N 2/90
See application file for complete search history.

(56) References Cited

U.S. PATENT DOCUMENTS

| 8,109,373 B2 | 2/2012 | Lim et al. | |
|---|---|---|---|
| 2009/0184554 A1* | 7/2009 | Paing | B60N 2/168 297/358 |

FOREIGN PATENT DOCUMENTS

| KR | 20-1994-0025460 U | 9/1994 |
|---|---|---|
| KR | 10-2017-0103277 A | 9/2017 |
| KR | 10-1947534 B1 | 2/2019 |

* cited by examiner

*Primary Examiner* — Anthony D Barfield
(74) *Attorney, Agent, or Firm* — Novick, Kim & Lee, PLLC; Jae Youn Kim; Jihun Kim

(57) ABSTRACT

An eccentricity prevention apparatus for a pumping device is configured to prevent the eccentric movement of rotating parts operating for moving a seat up and down. The eccentricity prevention apparatus includes: a clutch device provided inside a housing; and an elastic member providing an elastic restoring force to the clutch device in a direction compensating for eccentric movement of the clutch device tilted relative to a rotating axis thereof.

3 Claims, 8 Drawing Sheets

ECCENTRICITY PREVENTION APPARATUS FOR PUMPING DEVICE

CROSS REFERENCE TO RELATED APPLICATION

The present application claims priority to Korean Patent Application No. 10-2019-0066775, filed Jun. 5, 2019, the entire contents of which is incorporated herein for all purposes by this reference.

BACKGROUND OF THE INVENTION

Field of the Invention

The present invention relates to an eccentricity prevention apparatus for a pumping device that prevents the eccentric movement of rotating parts operating to move a seat up and down.

Description of the Related Art

A seat pumping device for a vehicle is a device mounted to a seat such that a seat occupant manually adjusts the height of a seat cushion according to the body type of the seat occupant. When the seat occupant manipulates a lever handle mounted to the side of the seat cushion clockwise or counterclockwise, the manipulating force of the lever handle is transmitted to a link device through the seat pumping device so that the seat cushion is raised or lowered in correspondence to the manipulating direction of the lever handle, whereby the height of the seat cushion is adjusted.

FIG. 1 is an exploded view illustrating a conventional seat pumping device for a vehicle.

Referring to FIG. 1, the conventional seat pumping device includes: a lever bracket 100 provided to be rotated integrally to the lever handle (not shown) manipulated by a user; a return spring guide 110 to which a return spring 112 providing an elastic restoring force to the lever bracket 100 is received; a housing 120 having the shape of a drum 122 and provided inside the seat cushion (not shown); a clutch device 130 received into the housing 120 and transmitting a rotation manipulating force of a user input from the lever bracket 100; a brake device 140 blocking torque input in reverse and maintaining the adjusted height of the seat cushion; and a housing cover 150 coupled to a side of the housing 120 to cover the housing 120.

In addition, a pinion 160 is provided in the brake device 140, the pinion being rotated by receiving a rotational force from the brake device, and protruding toward the outside of the housing cover 150.

Furthermore, as illustrated in FIGS. 2 and 3, the seat cushion 200 and a seat rail 300 are connected to each other in a four-bar linkage structure; a first end of a rack gear 310 is rotatably hinged to the seat rail 300; a second end of the rack gear 310 is provided in the direction of rising diagonally; and the pinion 160 is engaged with the second end of the rack gear 310.

Accordingly, when the pinion 160 is rotated, the pinion 160 moves on the rack gear 310 while each of the rack gear 310 and four-bar links rotates relative to a hinge shaft. Accordingly, the seat cushion 200 can be moved up and down depending on the direction in which the pinion 160 rotates.

In this case, to efficiently move the seat up and down, the pinion 160 and the rack gear 310 are required to be stably engaged with each other.

Accordingly, as illustrated in FIGS. 3 and 4, according to the characteristic of the arrangement structure in which the rack gear 310 is located on the upper part of the pinion 160 while being coupled to the seat cushion 200, a torsion spring 210 is configured to be mounted to the seat cushion 200 and to constantly provide the force of pushing the seat cushion 200 upward by using the spring force thereof. Accordingly, the pinion 160 pushes the rack gear 310 upward, so the pinion and the rack gear can be securely engaged to each other.

However, in such a structure, while the pinion 160 strongly pushes the rack gear 310 upward due to the excessive application of the spring force of the torsion spring 210, in particular, when a passenger does not sit on a seat, the pinion 160 is eccentric by being tilted relative to the rotating axis thereof as illustrated in FIG. 5. Accordingly, the rotating axes of the brake device and the clutch device rotating together with the pinion are also eccentric, so brake rollers provided inside the housing get caught in the inner wall surface of the housing, and gaps between parts provided therein occur.

Furthermore, in a state in which the eccentric movements of the rotating axes occur, the rotating parts get caught in fixed parts. Accordingly, while friction occurs between parts during initial rotation of the rotating parts, operation noise occurs.

Of course, apart from the spring force of the torsion spring described above, in the operation process of the pumping device, gaps between parts constituting the clutch device and the brake device occur, so the eccentric movements of rotating axes of the parts may occur.

The foregoing is intended merely to aid in the understanding of the background of the present invention, and is not intended to mean that the present invention falls within the purview of the related art that is already known to those skilled in the art.

SUMMARY OF THE INVENTION

Accordingly, the present invention has been made keeping in mind the above problems occurring in the related art, and the present invention is intended to propose an eccentricity prevention apparatus for a pumping device that prevents the eccentric movements of rotating parts operating for moving a seat up and down.

In order to achieve the above objective, according to one aspect of the present invention, there is provided an eccentricity prevention apparatus for a pumping device, the pumping device allowing a rotational force of a lever input to a clutch device to be output through a pinion, the prevention apparatus including: a housing; the clutch device provided inside the housing; an elastic member provided inside the housing, and providing an elastic restoring force to the clutch device in a direction compensating for eccentric movement of the clutch device tilted relative to a rotating axis thereof.

The elastic member may be provided between an inner surface of the housing and the clutch device.

A first surface of the elastic member may be supported by an inner surface of a drum part having a cylindrical shape provided at a center of the housing, and a second surface of the elastic member may be supported by an edge surface of a clutch drum provided to surround the clutch device, the edge surface facing the inner surface of the drum part.

The first surface of the elastic member may be coplanar with the inner surface of the drum part to be in contact therewith, and a second surface of the elastic member may be coplanar with the edge surface of the clutch drum to be in contact therewith.

The elastic member may be configured as a wave washer having a wave shape.

A convex portion of a first surface of the wave washer may be in linear contact with the inner surface of the drum part, and a convex portion of a second surface of the wave washer may be in linear contact with the edge surface of the clutch drum.

According to the present invention, the rotating axes of the clutch device and a brake device provided inside the housing are coaxial due to the elastic restoring force of the wave washer, and the pinion is also coaxial to the brake device. Accordingly, operation noise occurring during friction of rotating parts against fixed parts is prevented, and further, a gap between the clutch device and the brake device is removed such that the pumping operation of the pumping device is more stably performed.

BRIEF DESCRIPTION OF THE DRAWINGS

The above and other objects, features, and other advantages of the present invention will be more clearly understood from the following detailed description when taken in conjunction with the accompanying drawings, in which.

DETAILED DESCRIPTION OF THE INVENTION

Figure 1:
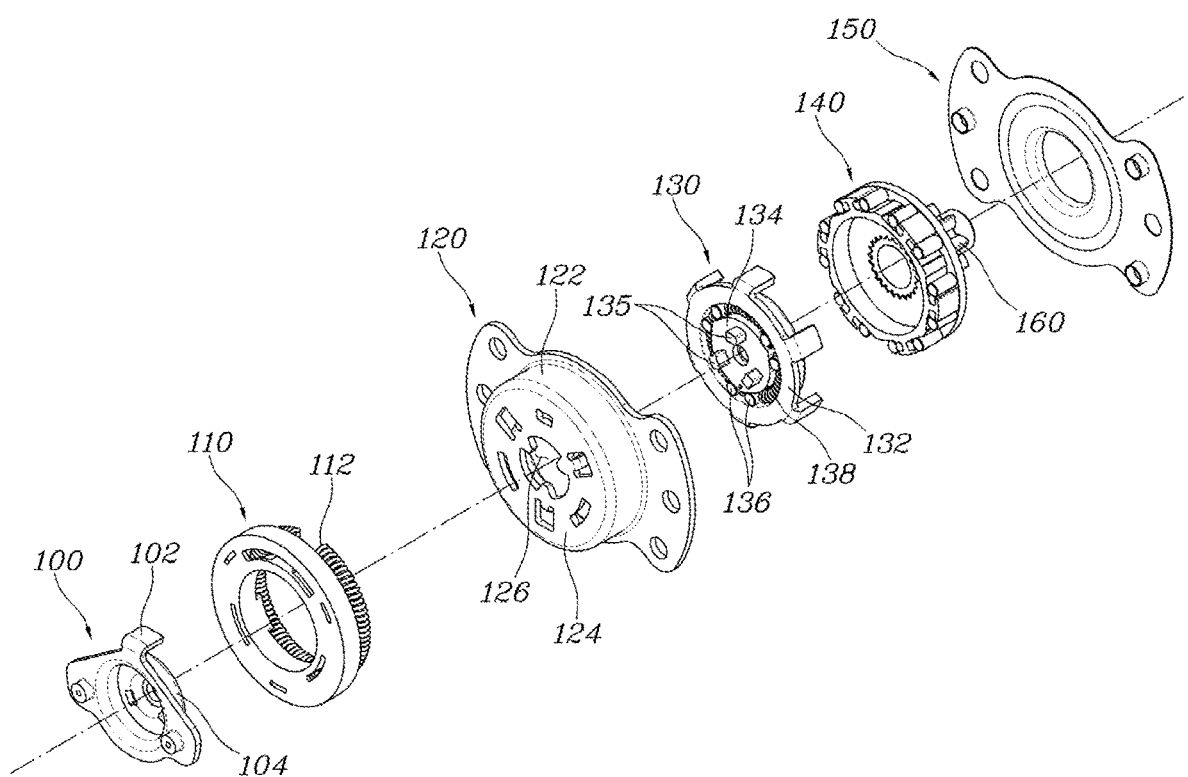
FIG. 1 is an exploded perspective view of a conventional seat pumping device.
Figure 2:
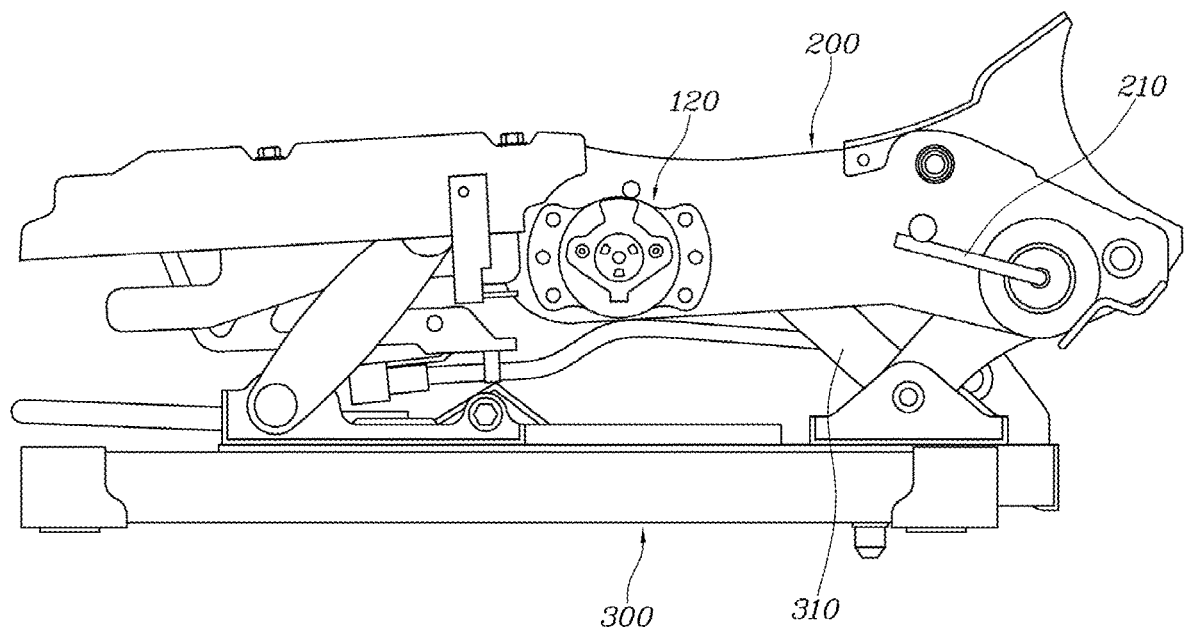
FIG. 2 is a view illustrating the action of a torsion spring applying force to raise a seat cushion upward while the conventional seat pumping device is mounted to a seat.
Figure 3:
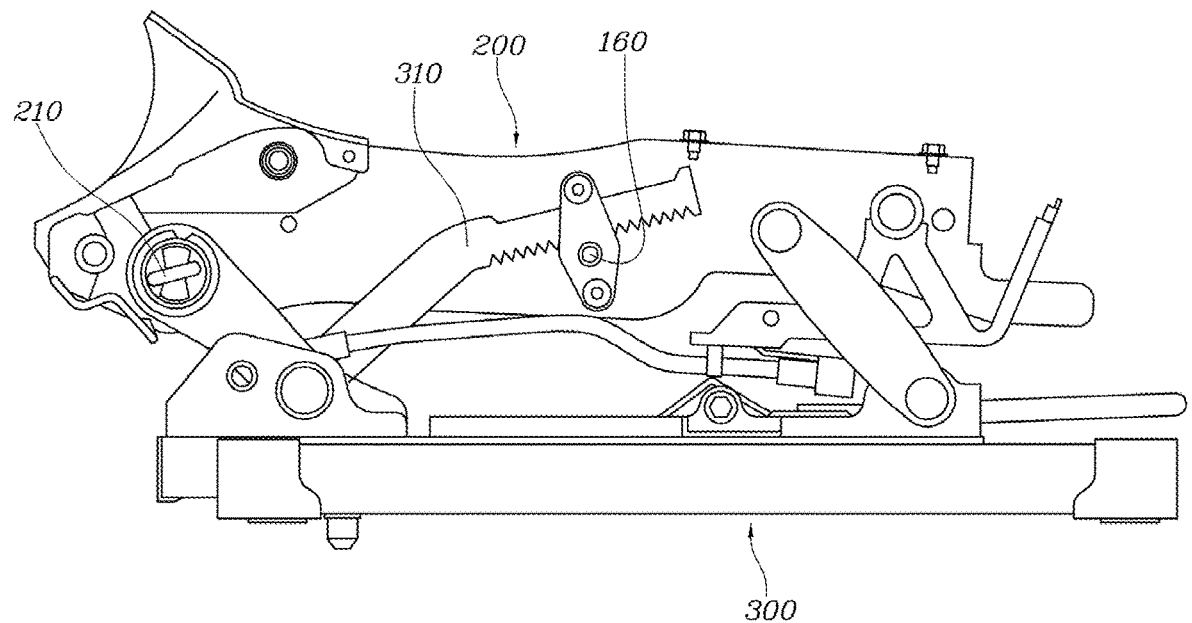
FIG. 3 is a view illustrating a state in which a pinion is pushed toward a rack gear by the action of the torsion spring of FIG. 2.
Figure 4:
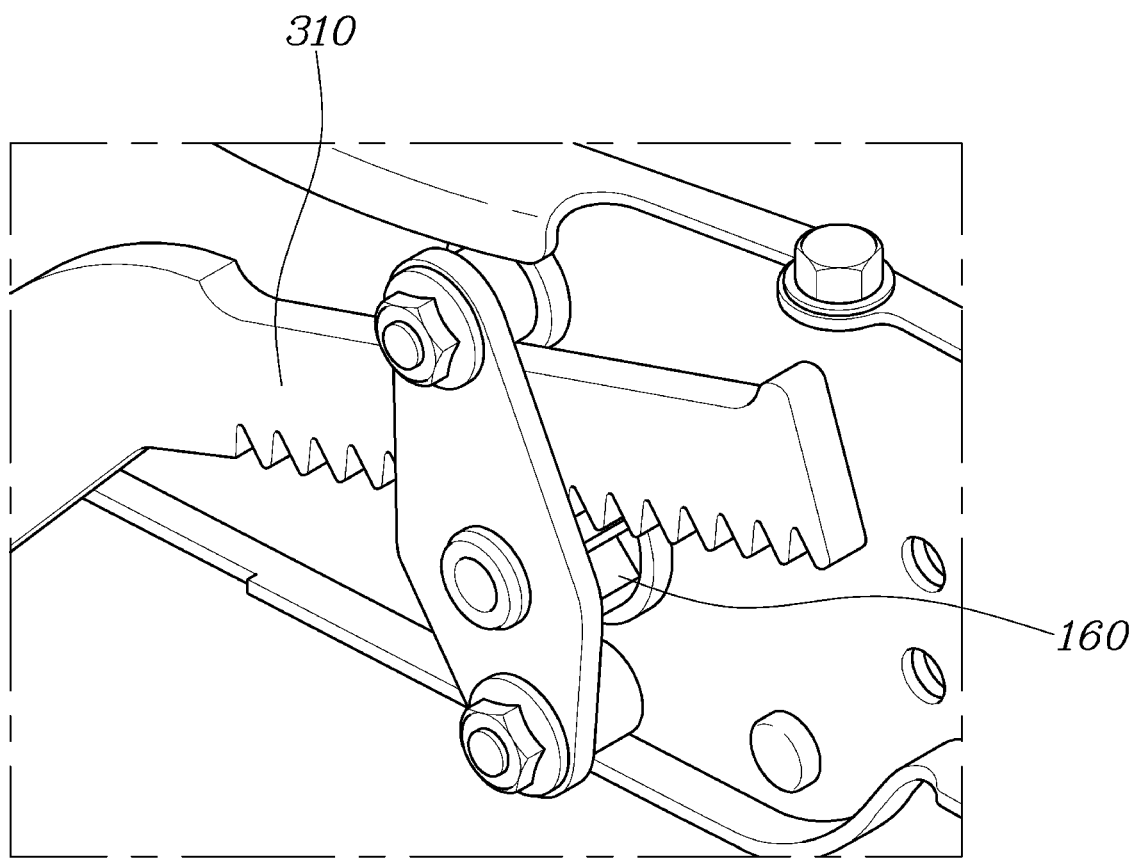
FIG. 4 is a view illustrating the engaged relationship of the pinion and the rack gear of FIG. 3.

Hereinbelow, an exemplary embodiment of the present invention will be described in detail with reference to the accompanying drawings.

In the pumping device of the present invention, a lever (not shown) is coupled to a clutch cam 21 of a clutch device 20; a rotational force of the lever is input to the clutch device 20 to rotate the clutch device; and the rotational force input to the clutch device 20 is output through a pinion 31.

Here, the clutch device 20 and a brake device 30 are provided inside the housing 10; a first end of the pinion 31 is coupled to the brake device 30; and a second end of the pinion 31 is exposed to the outside of the housing 10. Since the configuration of the clutch device 20 and the brake device 30 and the pumping operation of the pumping device using these devices are known arts, detailed description thereof will be omitted.

Figure 6:
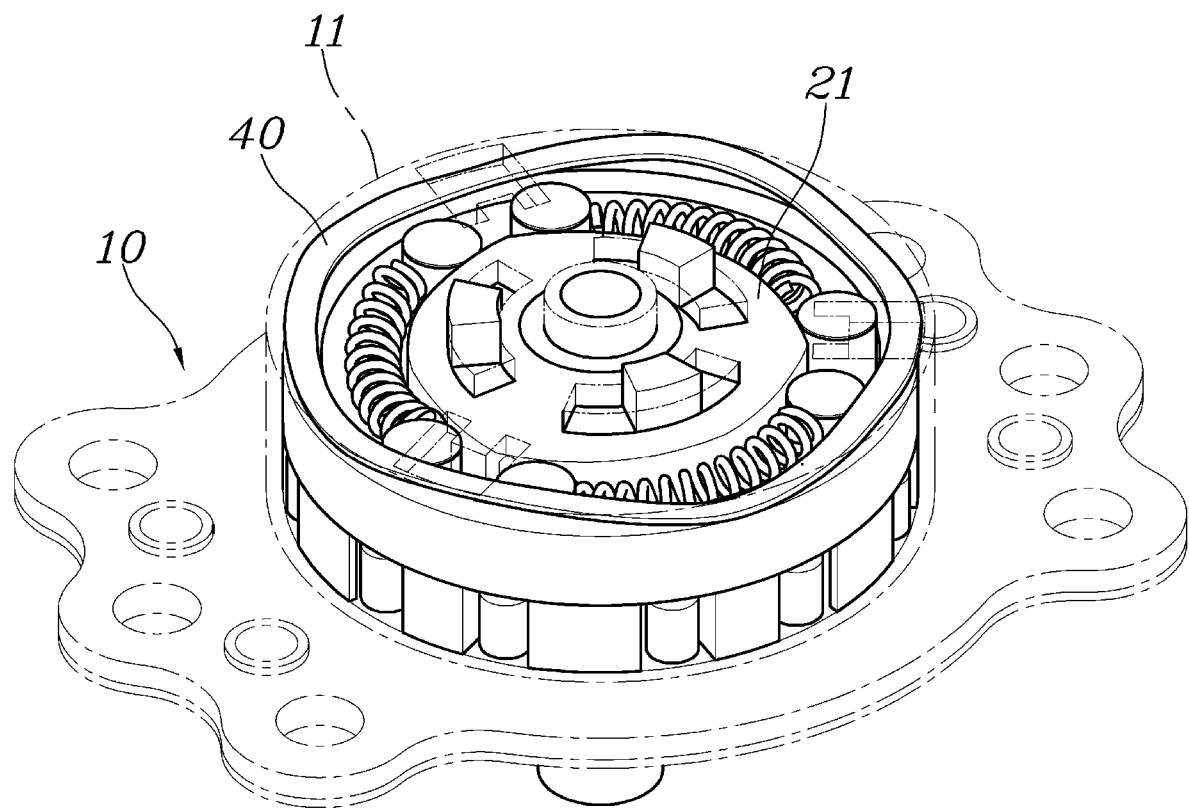
FIG. 6 is the state of an elastic member provided inside the housing of a pumping device of the present invention.

Meanwhile, referring to FIGS. 6 and 7, the characteristic configuration of the present invention will be described in detail. An eccentricity prevention apparatus for a pumping device of the present invention includes an elastic member 40 providing an elastic restoring force to the clutch device provided inside the housing 10 in a direction compensating for the eccentric movement of the clutch device 20 tilted relative to the rotating axis thereof.

Figure 5:
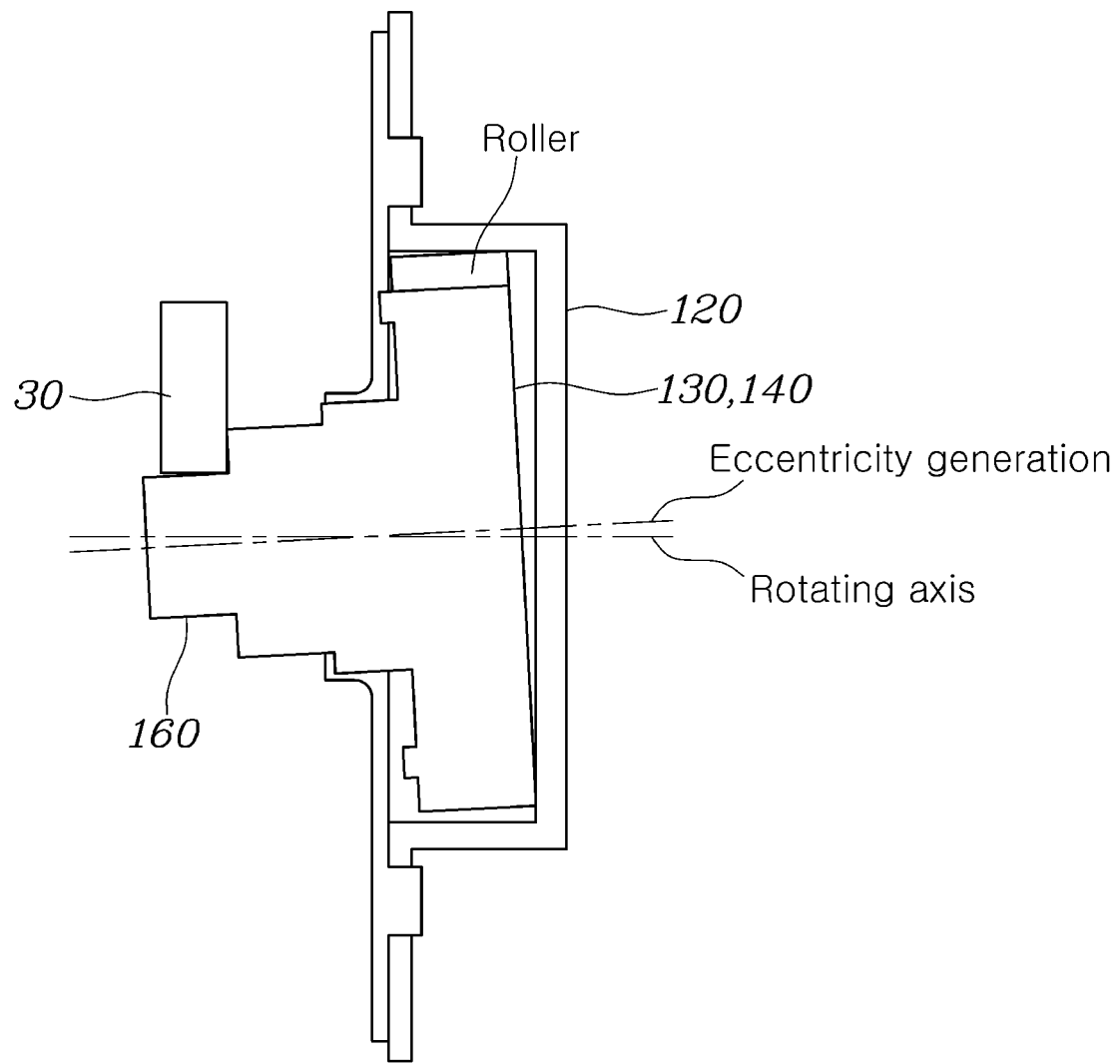
FIG. 5 is a view illustrating a situation in which parts inside a housing coupled to the pinion are eccentric by operation of the torsion spring of FIG. 2.

That is, when the rotating axis of the brake device 30 being coaxial to the pinion 31 is tilted and eccentric due to the movements of parts caused by the spring force of a torsion spring moving the pinion 31 upward or by the operation of the pumping device, the rotating axis of the clutch device 20 being coaxial to the rotating axis of the brake device 30 is also tilted and eccentric as illustrated in FIG. 5.

Accordingly, in the present invention, the elastic member 40 is used to provide the elastic restoring force to the clutch device 20 in a direction opposite to a direction in which the clutch device 20 is eccentrically tilted, so the rotating axis of the clutch device 20 is prevented from being eccentric. Accordingly, the rotating axes of the clutch device 20, the brake device 30, and the pinion 31 are maintained coaxially, thereby preventing the clutch device 20, the brake device 30, and the pinion 31 from being eccentric.

Accordingly, during the operation of the pumping device, the rotating axes of the clutch device 20 and the brake device 30 provided inside the housing 10 are coaxial, and the pinion 31 is also coaxial to the brake device 30, so operation noise occurring during friction of the rotating parts against fixed parts is prevented, and a gap between the clutch device 20 and the brake device 30 is removed such that the pumping operation of the pumping device can be more stably performed.

Figure 7:
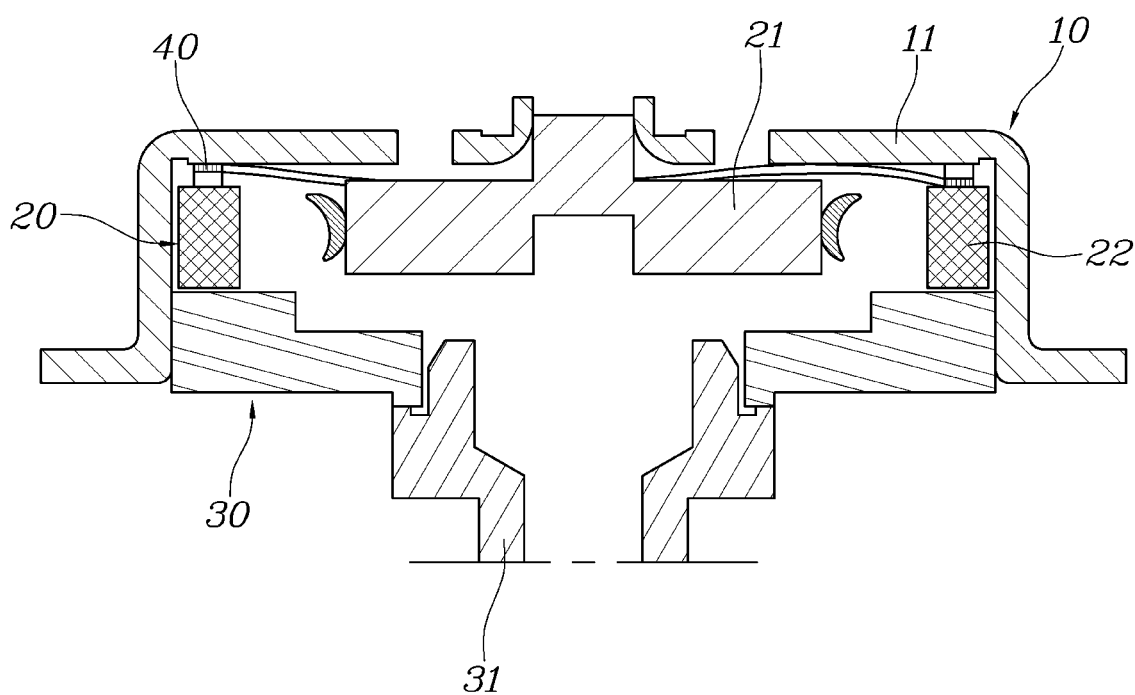
FIG. 7 is a sectional view of an inner part of the housing provided with a wave washer of the present invention.

In addition, as illustrated in FIG. 7, the elastic member 40 may be provided between the inner surface of the housing 10 and the clutch device 20.

Preferably, the first surface of the elastic member 40 is supported by the inner surface of a drum part 11 having a cylindrical shape provided at the center of the housing 10.

Furthermore, the second surface of the elastic member 40 can be supported by the edge surface of a clutch drum 22 provided to surround the clutch device 20, the edge surface facing the inner surface of the drum part 11.

In this case, the first surface of the elastic member 40 may be coplanar with the inner surface of the drum part 11 to be in contact therewith, and the second surface of the elastic member 40 may be coplanar with the edge surface of the clutch drum 22 to be in contact therewith.

Accordingly, opposite surfaces of the elastic member 40 are in uniform contact with the drum part 11 and the clutch drum 22 to increase the support area thereof, thereby supporting the parts inside the housing 10 more stably.

Figure 8:
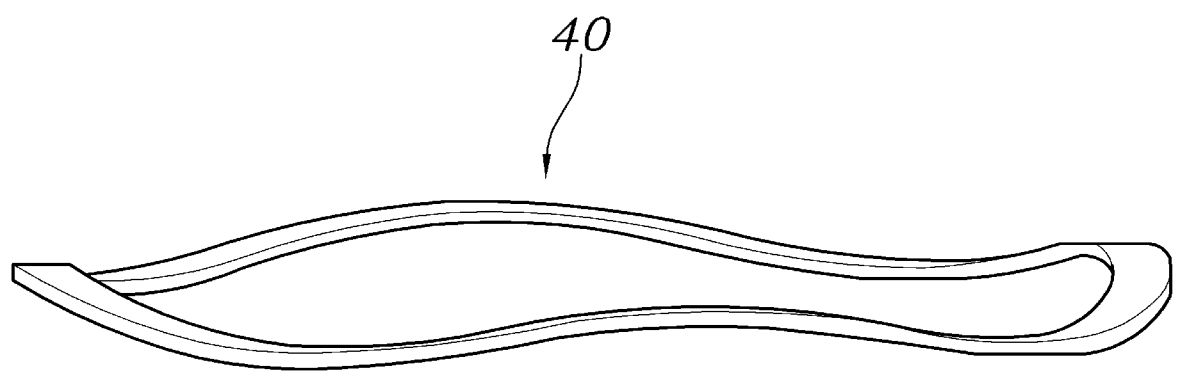
FIG. 8 is a view illustrating the wave washer applied as the elastic member of the present invention.

In addition, as illustrated in FIG. 8, a wave washer formed in the wave shape of a ring structure may be applied as the elastic member 40.

Accordingly, a convex portion of a first surface of the wave washer may be in linear contact with the inner surface of the drum part 11, and a convex portion of a second surface of the wave washer may be in linear contact with the edge surface of the clutch drum 22.

That is, a convex portion of a surface of the wave washer is supported to be in linear contact with the drum part 11 along the inner surface thereof, and a convex portion of the other surface of the wave washer is supported to be in linear contact with the clutch drum 22 along the edge thereof.

Accordingly, stress is prevented from being concentrated on specific portions of the drum part 11 and the clutch drum 22, so the durability of the parts is improved.

According to such a structure, when the clutch drum 22 is tilted to any one side relative to the rotating axis thereof, the clutch drum 22 is tilted toward the drum part 11 and presses a portion of the wave washer located at the tilted portion. However, while the pressed portion is elastically restored by the elastic restoring force of the wave washer, the clutch drum 22 is restored to the position thereof located before the rotating axis of the clutch drum is tilted, so the rotating axes of the clutch device 20, the brake device 30, and the pinion 31 are coaxial.

Accordingly, in the present invention, the rotating axes of the clutch device 20 and the brake device 30 provided inside the housing 10 are coaxial due to the elastic restoring force of the wave washer, and the pinion 31 is also coaxial to the brake device 30. Accordingly, operation noise occurring during the friction of the rotating parts against fixed parts is prevented, and the gap between the clutch device 20 and the brake device 30 is removed, so the pumping device can be more stably moved up and down.

Meanwhile, although the exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An eccentricity prevention apparatus for a pumping device, the pumping device allowing a rotational force input to a clutch device to be output through a pinion, the eccentricity prevention apparatus comprising:

a housing;

the clutch device disposed inside the housing;

an elastic member disposed inside the housing, and providing an elastic restoring force to the clutch device in a direction compensating for eccentric movement of the clutch device tilted relative to a rotating axis thereof, wherein a first surface of the elastic member is supported by an inner surface of a drum part having a cylindrical shape provided at a center of the housing, and a second surface of the elastic member is supported by an edge surface of a clutch drum to surround the clutch device, the edge surface facing the inner surface of the drum part, wherein the elastic member includes a wave washer having a wave shape, and wherein a convex portion of a first surface of the wave washer is in contact with the inner surface of the drum part, and a convex portion of a second surface of the wave washer is in contact with the edge surface of the clutch drum.

2. The apparatus of claim 1, wherein the elastic member is disposed between an inner surface of the housing and the clutch device.

3. The apparatus of claim 1, wherein the first surface of the elastic member is coplanar with the inner surface of the drum part to be in contact therewith, and a second surface of the elastic member is coplanar with the edge surface of the clutch drum to be in contact therewith.

* * * * *